(No Model.)  
6 Sheets—Sheet 1.

C. T. MASON, Jr.
COTTON HARVESTER.

No. 345,246. Patented July 6, 1886.

Fig. 1.

WITNESSES  
Gustave Dieterich  
Fred Huetwohl

INVENTOR  
Charles T. Mason Jr.  
by Park Benjamin, Attorney

(No Model.) 6 Sheets—Sheet 4.

C. T. MASON, Jr.
COTTON HARVESTER.

No. 345,246. Patented July 6, 1886.

(No Model.) 6 Sheets—Sheet 5.

C. T. MASON, Jr.
COTTON HARVESTER.

No. 345,246. Patented July 6, 1886.

UNITED STATES PATENT OFFICE.

CHARLES T. MASON, JR., OF SUMTER, SOUTH CAROLINA, ASSIGNOR TO THE COTTON HARVESTER COMPANY.

COTTON-HARVESTER.

SPECIFICATION forming part of Letters Patent No. 345,246, dated July 6, 1886.

Application filed May 2, 1885. Serial No. 164,214. (No model.)

*To all whom it may concern:*

Be it known that I, CHARLES T. MASON, Jr., of Sumter, Sumter county, South Carolina, have invented a new and useful Improvement in Cotton-Harvesters, of which the following is a specification.

The invention relates to a machine for gathering or picking cotton from the bolls of the plant in the field, the said machine being of the same class as that described by me in a pending application for Letters Patent, No. 114,167, filed December 11, 1883.

The object of my present invention is to improve the construction of the apparatus, in order to render the same more generally efficient, to prevent any possible breaking or injury to the plant, and to insure more perfect picking of all the cotton in condition to be harvested.

My invention consists, chiefly, in the novel construction and arrangement of the devices which on each side of the machine support the inwardly-projecting picker-stems which directly gather the cotton, and which also contain mechanism for imparting to said stems the necessary movements of translation and rotation on their axes. By reason of my improved construction the picker-stems are now introduced into the plant in a longitudinal or axial direction instead of being presented angularly, as when they are rigidly affixed radially to a vertical shaft and by the rotation of the latter so moved into the plant; also, by reason of the motions imparted to said stems, as hereinafter explained, I render them self-clearing, and obviate the necessity of bars, doffers, or brushes for removing from them the gathered cotton.

Referring to the accompanying drawings, Figs. 8 and 9 together form a partial plan view showing the direction of rotation of the cylinders and that of forward movement of the machine.

Similar letters of reference indicate like parts.

Figure 1:
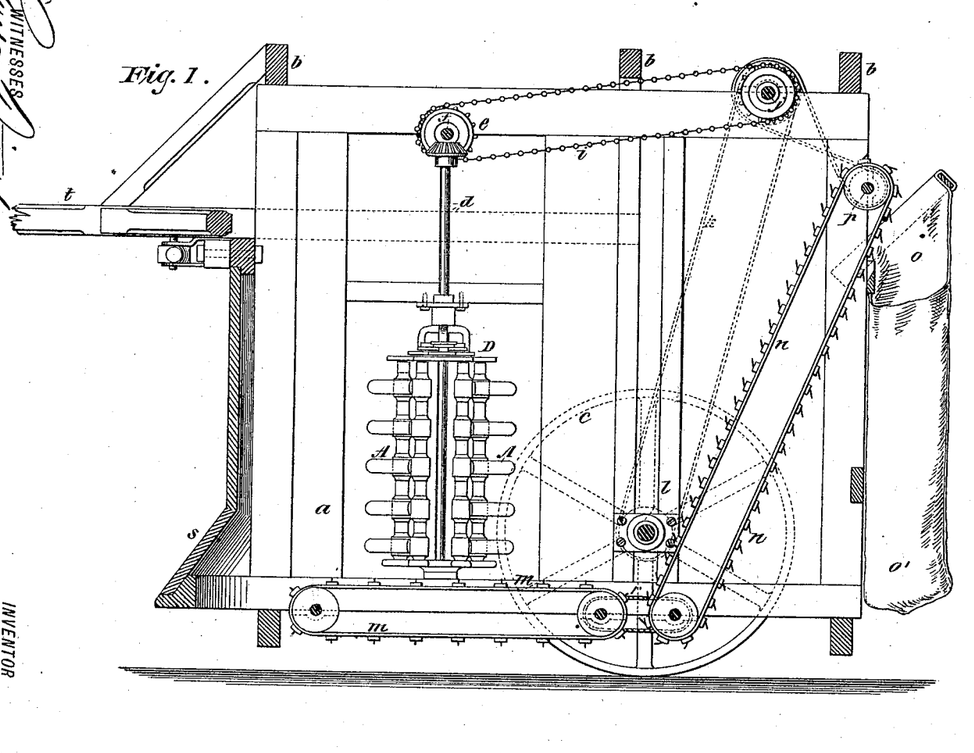
Figure 1 is a sectional side elevation of a cotton-harvester substantially the same in general construction, as that set forth in my aforesaid application, and containing my improved picking devices.
Figure 2:
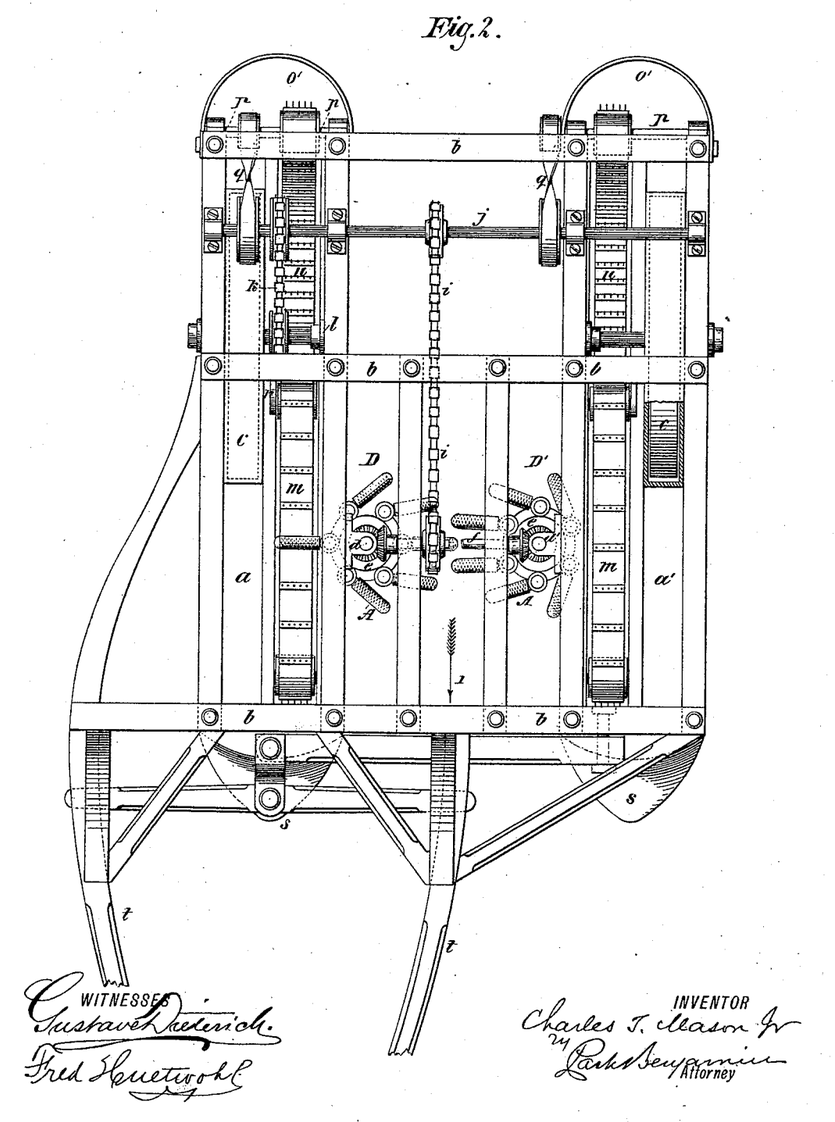
Fig. 2 is a plan view of the same.

Referring more particularly to Figs. 1 and 2, the machine shown consists of two compartments, $a$ and $a'$, connected by cross-bars $b$, and supported on wheels $c$. These wheels have short axles respectively journaled in the framework of each compartment, and are suitably incased. The machine is thus arranged to straddle a row of plants, the wheels running on each side, and the plants passing through the space between the two compartments $a$ and $a'$. On opposite sides of the machine are disposed two vertical picking devices, or so-called "cylinders," D and D'. These cylinders are precisely alike, are arranged upon vertical shafts $d$ and $d'$, and are constructed of an assemblage of smaller cylinders, as more particularly hereinafter set forth. The cylinders carry the picking-stems A, which thus extend into the space between the compartments, and as the plants, as already explained, enter said space as the machine is drawn over them the picking-stems and plants are in this way brought into contact.

The cylinders D and D' are rotated by means of the shafts $d$ and $d'$, which communicate by bevel-gearing $e$ with the transverse shaft $f$. Said shaft $f$ is rotated by the chain belt $i$, and this in turn receives motion from from the shaft $j$, which is rotated by a belt, $k$, leading from a pulley on shaft $j$ to a pulley on the wheel-axle $l$. The cotton gathered by the picking-stems A falls upon conveying-belts $m$, which are arranged in the lower portion of the compartments $a\,a'$, and thence is conducted to the elevator-belts n, by which it is delivered into the bags o, secured in the rear of each compartment a a'. The upper pulleys of the elevator-belts n are arranged on short shafts p, which are driven by cross-belts q from the shaft j. The conveyer-belts m and elevator-belts n are preferably provided with short teeth to engage the cotton. The lower pulley-shaft of the elevator-belt n is belted to the rear pulley-shaft of the conveyer-belt m by a belt, r, and in this way motion is communicated to the conveyer-belt.

The compartments a and a' are boarded or covered on their lateral sides. The front end of each is rounded, and at its lower portion is provided with a projection, s, analogous to the pilot of a locomotive, the object of which is to separate the plants in the row passing through the machine from the plants in the adjacent rows. The animal drawing the machine is secured to the shafts t.

The operation of the machine is as follows: As it is drawn forward in the direction of the arrow 1, Fig. 2, the pilots s push all the plants of the row to be harvested into the space between said compartments while moving the plants of the adjacent rows on each side outwardly and clear of the wheels. The picking-cylinders D and D' have a revolving motion rearwardly equal in speed to the forward motion of the machine. The picker-stems A are therefore caused simply to enter the plants, and are then withdrawn, being stationary, or nearly so, while in the plants. While in this position, however, the picker-stems rotate on their own axes, and so gather cotton. The construction of the stem is such that it collects only the ripe cotton, and does not gather branches, leaves, or unripe bolls. As the machine progresses, the filled stems move into the compartments, and the empty stems in turn meet the succeeding plants. As soon as the stems successively arrive inside the compartments, they discharge their cotton, which falls upon the horizontal conveyer-belts m. Thence it passes to the elevator-belts n, and finally is delivered into the bags o', provided in rear of the machine.

All of the foregoing-described specific mechanism and combinations thereof, excepting the particular construction and arrangement of picking-cylinders D and D' are fully set forth in myaforesaid pending application, and are not herein claimed by me. I do not limit myself, however, to the use of my improved picking devices, or so-called "cylinders," necessarily, in a cotton-harvesting machine containing the aforesaid mechanism and parts, because other mechanism and parts may be substituted, in combination with which the said cylinders will continue to perform their functions in like manner. The foregoing machine is, however, one in which I have embodied my improved cylinders, and have practically and successfully used the same.

Figure 8:
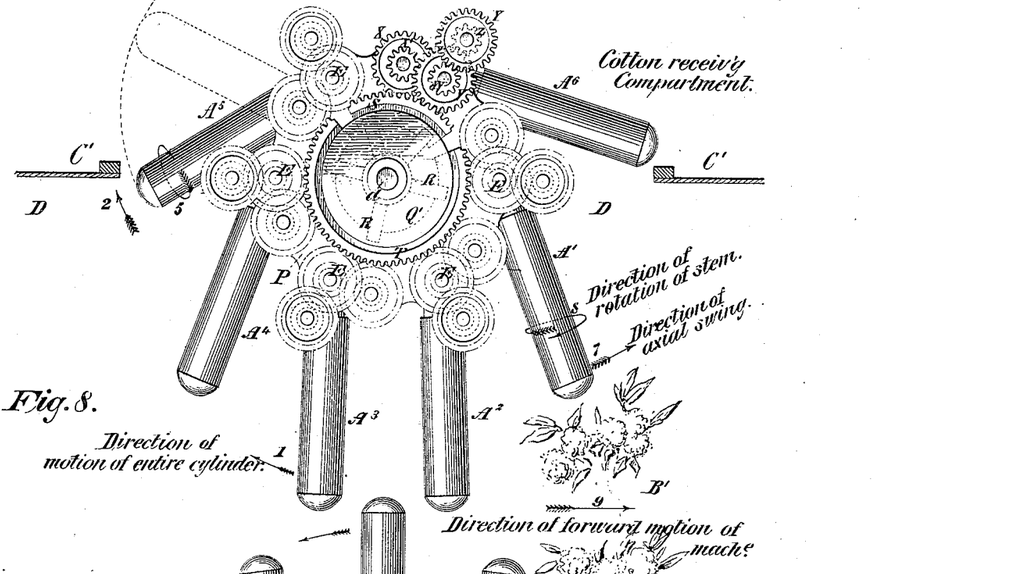
Fig. 8 shows a plan view, partly in section.
Figure 9:
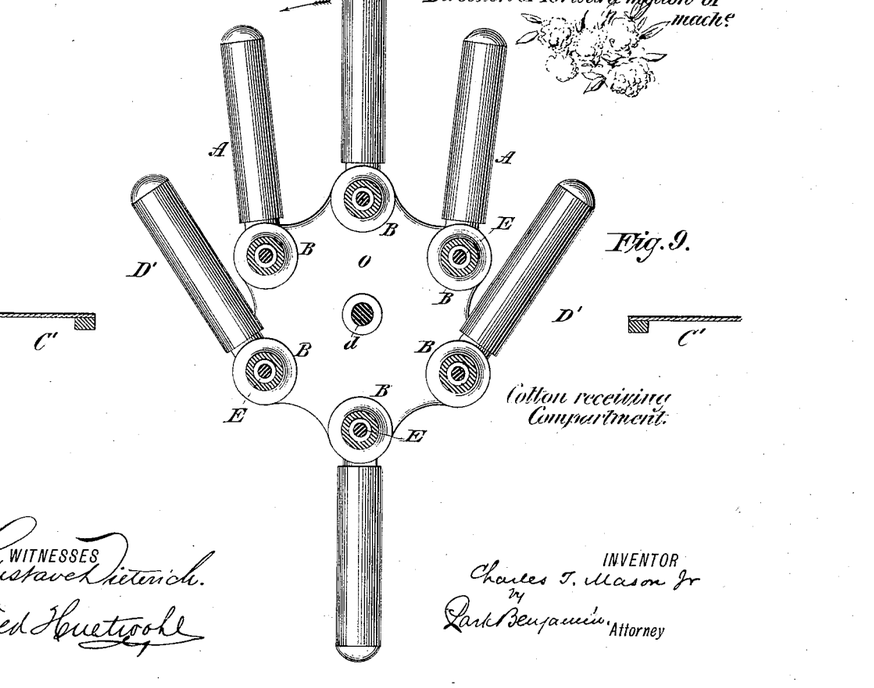
Fig. 9 is a horizontal section on the line $z\,z$ of Fig. 3.

Proceeding now to the explanation of the construction of my improved cylinders, each cylinder D or D' contains several subordinate or smaller cylinders, B, of which six are here shown, as indicated in Figs. 8 and 9. Each subordinate cylinder B is formed of a number of parts or sections, C, Figs. 3 and 5, which sections are placed end to end upon a vertical central shaft, E, and connected rigidly together in any suitable way—as, for example, by bolts or screws—as shown in section in Fig. 5. It will be observed that each section C contains a lower enlarged opening, F, a solid central portion, G, and an upper flared opening, H, Fig. 5. When two parts, C, are bolted or otherwise fastened together, the openings F and H form a closed chamber or compartment, through which passes the shaft E. In the part F of each section C is a circular opening, I, Fig. 3, which receives a long bearing, J, fast upon the shaft or rod K of the picker-stem A. Near the inner end and around the circumference of said bearing J is formed a groove or channel, K', which receives a pin or cotter, L, which is inserted in an aperture formed in the section C. By means of this pin L the stem A is secured in place, while said stem still remains free to rotate. On the inner end of the stem-rod is rigidly secured a bevel-pinion, M, which engages with a bevel-pinion, N, fast upon the shaft E.

Figures 5, 6:
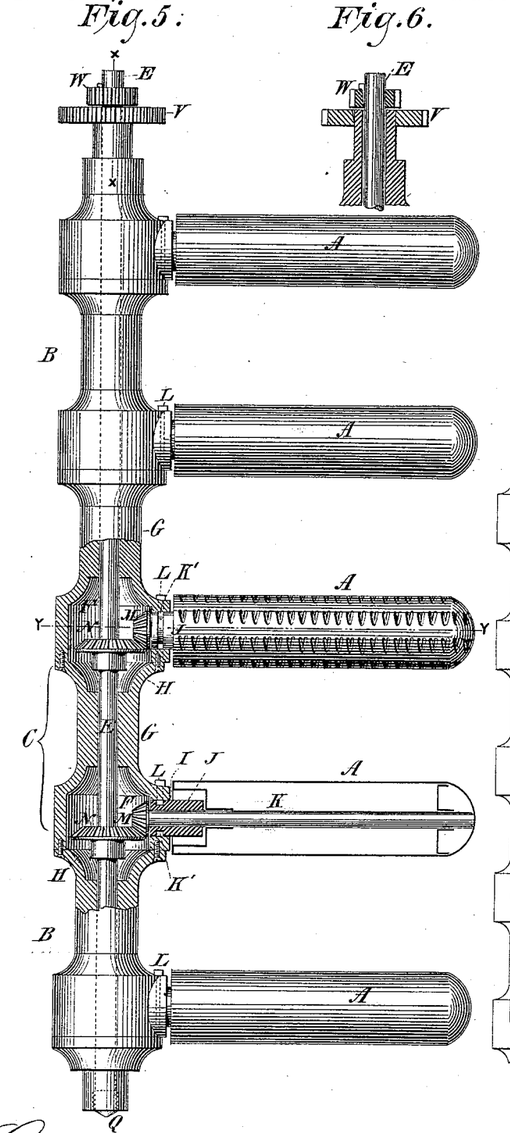
Fig. 5 is an elevation of one of the subordinate cylinders, shown also partly in section, and having the picker-stems in place.
Fig. 6 is a partial vertical section on the line $x\,x$ of Fig. 5.

It should be clearly understood that the sections C are not secured to the shaft E, but are attached end to end, as described, so as to form a sleeve or cylinder, B, surrounding said shaft E.

All of the stems A are arranged as above set forth, and any one of them may be removed by taking out the cotter L and then withdrawing the bearing J from the opening I. The bearings and openings are preferably constructed so that the stems will be interchangeable, any stem fitting into any opening, and its bevel-gear engaging, as set forth. This arrangement offers an important advantage in increasing the facility of manufacture of the parts, and also of allowing the ready removal of one stem and the substitution of another in case of injury to or wear of the former.

It will be apparent that the revolution of the stems A on their individual axes is effected by the rotation of the shaft E, through the medium of the several bevel-gears M N.

Figure 3:
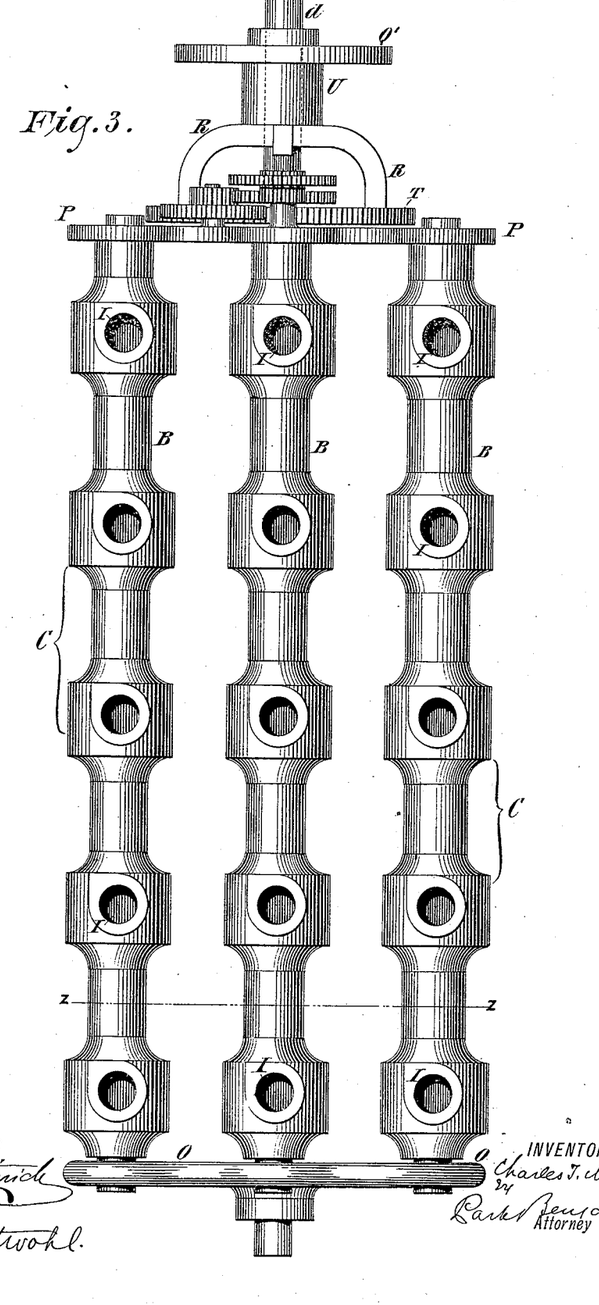
Fig. 3 is an elevation of my improved cylinder with the picker-stems removed.
Figures 4, 7:
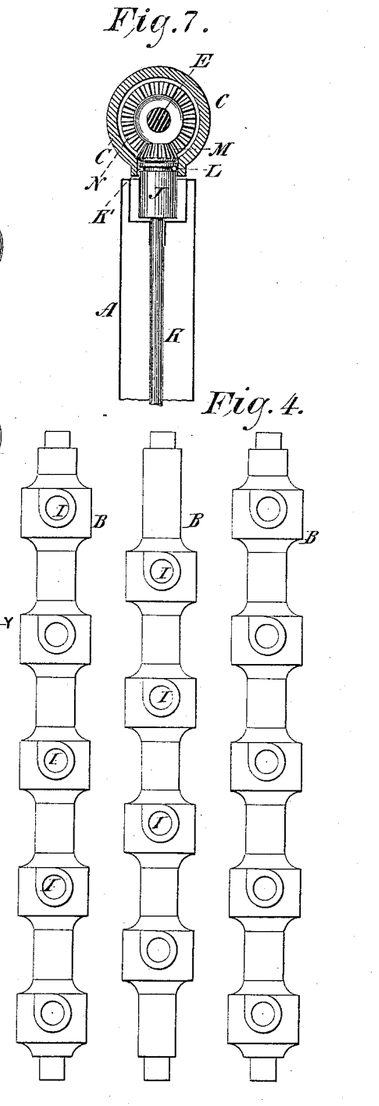
Fig. 4 represents a modification of the arrangement of the smaller subordinate cylinders, B, whereby the apertures for receiving the stems, and hence the stems themselves, are disposed alternating instead of in the same horizontal planes, as shown in Fig. 3.
Fig. 7 is a horizontal section on the line $y\,y$ of Fig. 5.

The apertures I in the several subordinate cylinders B may be disposed in the same horizontal plane, as shown in Fig. 3, or they may be alternated, as shown in Fig. 4.

The sections C of each of the subordinate cylinders B, being secured together end to end, as described, to form a sleeve inclosing each of the shafts E, are journaled at their extremities in the bottom plate, O, and top plate, P. These plates O and P are rigidly secured to the central shaft d.

To recapitulate, the central shaft d supports the plates O and P. Between these plates and surrounding the central shaft d are disposed the six subordinate cylinders B. Each cylinder B incloses a central shaft, E, and is composed of a series of sleeve-sections, C, detachably fastened together end to end. An advantage of this construction is, that by removing or adding sections C the cylinder B can be lengthened or shortened at will. The shaft E rotates inside the sections C. The united sections C are journaled at the upper and lower ends of the continuous sleeve or cylinder B formed by them in the upper and lower plates, P and O. The stems A are inserted in openings I in the sections C, and are rotated on their individual axes by means of the bevel-gearing M N and the shaft E. The lower end of shaft E rests on a stud, Q, inserted in the lowest section C, the object being to diminish friction and undue wear.

From the foregoing it will be apparent that—

First. The entire picking device, or so-called "cylinder," D, having the upper and lower plates, P and O, and the subordinate cylinders B, is rotated by the shaft $d$, which is driven, as already described, by intermediate gearing from the wheel-axle. The effect of this is to carry the picker stems A in a circular path into and out of the plants and cotton-receiving compartments alternately.

Second. Each stem A is rotated on its individual axis, and, as will be hereinafter explained, in alternately-opposite directions. The effect of this is to cause the stems to gather cotton while in the plant and to release it while in the cotton-receiving compartment.

Third, and lastly. By reason of certain rotary movements imparted to the cylinders B, the axes of the stems A, while the latter are being carried around and individually rotated, as above described, are so inclined or directed as that the stems are successively thrust, point foremost, in a longitudinal direction into the plants, and then reversely drawn therefrom; or, in other words, the stems are made to enter and leave the plants in lines tangential to the circle described by the rotation of the plates P and O.

I will now proceed to describe the gearing and other mechanism whereby the foregoing results are effected.

Figures 10, 11:
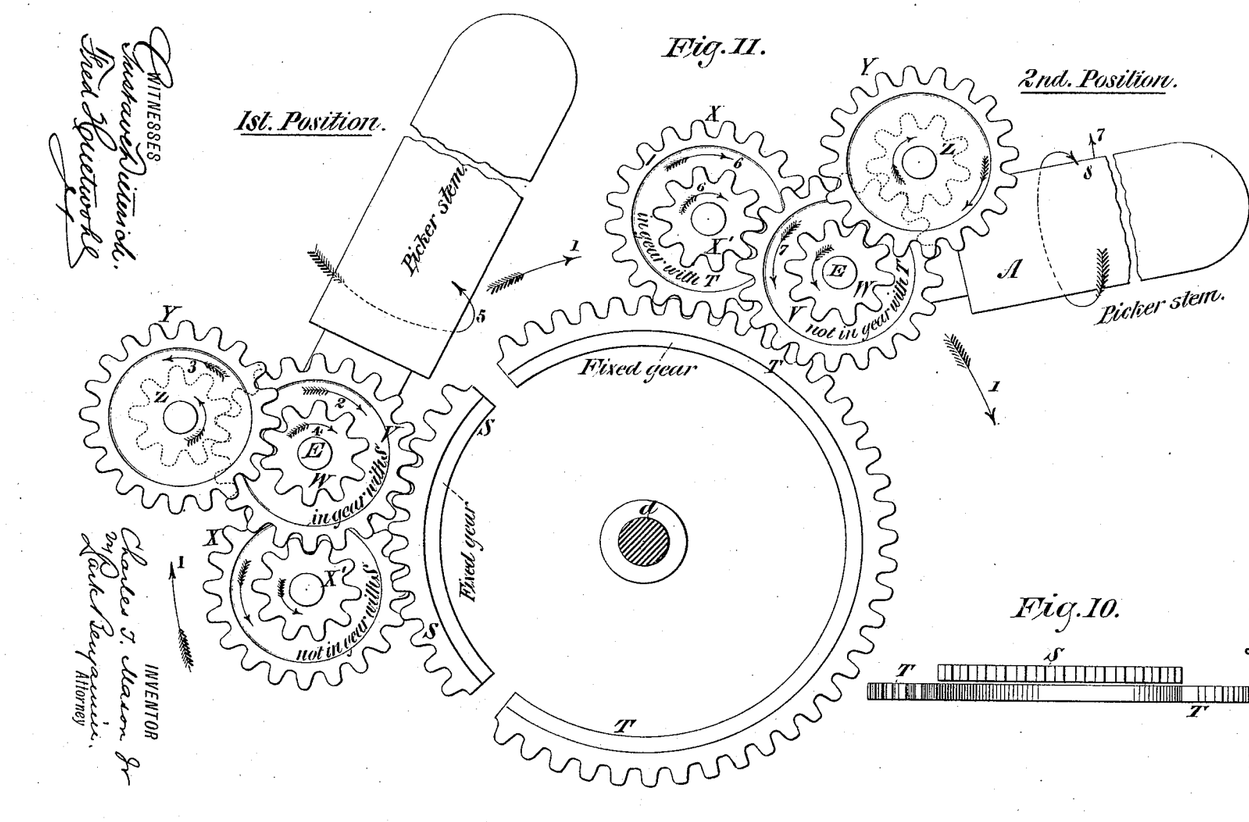
Fig. 10 is a side elevation of the fixed segmental gears S and T.
Fig. 11 is a diagram showing the arrangement and operation of the transmitting mechanism.

To the framing of the machine is secured an annular plate, Q', depending from which is a sleeve, U, and from sleeve U arms R, which carry a fixed segmental gear, S, and a fixed segmental gear, T. The two gears S and T, it should particularly be noticed, are not in the same horizontal plane, the gear S being above the gear T, as indicated in Fig. 10; but the two segments S and T, complete or very nearly complete a circle, as shown in Figs. 8 and 11. It is preferable to form the plate Q', arms R, and gears S and T in one piece as a single casting. The rotary cylinder-shaft $d$ passes through the sleeve U. To the upper end of the cylinder B, formed of the united sections C, is fixed a gear-wheel, V, Figs. 5 and 11. On the upper end of the shaft E, inclosed in said cylinder B, is fixed a smaller gear-wheel, W. The gear-wheel V on the cylinder B is arranged on the same horizontal plane as the fixed segmental gear S; hence it will engage with said gear S, but will not engage with the other fixed segmental gear, T, because it passes over said gear as the plates O and P and other mechanism of the cylinder D are carried around by the rotation of shaft $d$. Upon the upper plate, P, and rotating on a short vertical axis secured thereto, is a gear-wheel, X, of about the same size as the gear-wheel V. This wheel is placed on a lower level than wheel V, and is thus disposed to engage with the fixed segmental gear T, but not with the fixed segmental gear S, because it passes below said gear S as the mechanism of the cylinder D is carried around by the rotation of shaft $d$. Fastened upon the gear-wheel X is a gear-pinion, X', which engages with the gear-wheel V. Also rotating on a short vertical axis to the top plate, P, is a gear-wheel, Y, which engages with the pinion W. Fixed on the wheel Y is a pinion, Z, which engages with gear-wheel V.

The operation of the gearing just described will easily be followed from the diagram, Fig. 11, which shows this mechanism in two positions. The mechanism composing the cylinder D and rotated by shaft $d$ is supposed to be revolving in the direction of the large arrows 1, Fig. 11.

First position: The gear-wheel V on the subordinate cylinder B is now engaged with the fixed segmental rack S. Consequently as said gear-wheel is bodily carried around it is rotated by the fixed rack and said cylinder B, and hence the stems thereon are swung in a circular direction, (indicated by the arrows 2.) The gear-wheel V, in turning, actuates pinion Z; hence wheel Y, affixed thereto, in the direction of the arrows 3, and the wheel Y turns the pinion W in the direction of the arrow 4, which is the same as that of arrow 2. As pinion W is fast on shaft E, that shaft is consequently rotated, and its motion is communicated by the bevel-gears M N to the several picker-stems A, and those stems are turned in the direction of the arrow 5. The pinions W and X, not being in gear with the fixed segmental rack, are simply turned idly by reason of the engagement of wheel V and pinion X'. The cylinder D now continuing its motion in the direction of the arrows 1, the wheel V runs off the fixed segmental rack S, and because it is placed on a higher horizontal plane it cannot engage with the segmental rack T when the same is reached; but with this rack T the gear-wheel X, as already stated, can engage, and this is the condition of affairs represented in the second position of Fig. 11.

Second position: Here the gear-wheel X is in engagement with the segmental rack T. The gear-wheel V is not engaged with said rack. The gear X, and consequently the pinion X', fixed thereon, rotates in the direction of the arrows 6. The pinion X' rotates the gear V in the direction of the arrows 7; but the direction of arrows 7 in the second position is opposite to that of the direction of arrows 2, in the first position; consequently, although the direction of motion of the whole cylinder D remains the same, the picker-stems are now being swung in a reverse direction to that in which they before moved; and inasmuch as the direction of motion of the gear V is reversed, so, also, is the direction of motion of the gears Y Z, and consequently the picker-stems themselves now turn on their individual axes, as indicated by the arrow 8, or in a direction opposite to that of the arrow 5. The connection of this arrangement with the actual working of the machine will be understood from Figs. 8 and 9. Here are shown the two main picking devices, or so-called "cylinders," D D'. The space B' is that in which the other plants enter. At C' are the inner walls of the cotton-receiving compartments. The machine is supposed to be moving from left to right, as indicated by the arrow 9. (Marked here also "Direction of forward motion of the machine.") The cylinders D and D' are rotating, as indicated by the arrow 1, (here also marked "Direction of motion of entire cylinder,") in the opposite direction to the forward motion of the entire apparatus, and at about the same speed. Consequently by the composition of these two motions the picking-stems remain stationary while in the plants, and do not drag or bend the same.

Considering now the operation of the several stems shown in Fig. 8, the stem A' is in the position already explained as the second position shown in the diagram, Fig. 11. It is therefore rotating in the direction of the arrow 8, (here also marked "Direction of rotation of stem,") and its axis is swinging in the direction of arrow 7, (here also marked "Direction of axial swing.")

From the second position of Fig. 11 it will be apparent that the speed of the axial swing of the stems is reduced by the interposition of the pinion X' between the gears X and V. In practice this speed should be so timed that while the stems are being bodily carried rearward their axes will be slowly swung forward, so that they will successively assume as they reach certain points the several positions indicated by A' A² A³ A⁴. In this way, as is obvious from Figs. 8 and 9, the stems as they meet the plants are thrust into them longitudinally, and then are withdrawn in the same direction, meanwhile rotating on their axes and gathering cotton. During all this operation the gear X is running on the fixed segmental rack T.

When by the rotation of the cylinder D each stem has completed its travel in the cotton-space, the gear X will run off the segmental rack T, and the gear V will have engaged with the segmental rack S. The mechanism will then be disposed as represented in the first position of Fig. 11. Now, the gear V, it will be observed, receives motion directly by reason of its contact with rack S, and hence it will run much faster than it did before, when it received motion through gear X and pinion X'; and, furthermore, the direction of axial swing (indicated by the arrow 2) is reversed. Consequently the stem will be carried round from the positions $A^5$ to $A^6$ very rapidly. At the same time the direction of rotation of the stem itself is reversed, as indicated by the arrow 5. The stems marked $A^5$ and $A^6$ in Fig. 8 are in about the positions they assume in entering and leaving the cotton-receiving compartments. It will be apparent, therefore, first, that while in the cotton-receiving compartments the stems are swung around, as indicated by dotted lines, Fig. 8, with increased rapidity, and, second, that the stems are rotating more rapidly on their individual axes while in the cotton-receiving compartments than while in the cotton-plants. The consequence of this quick swing is, that the period in which the stems are out of the plants is diminished. The consequence of the rapid reverse axial revolution is, that the gathered cotton on the stem is in this way thrown off without the aid of brushes, or doffer-bars, or like devices for positively removing the cotton from the stems. The cotton is simply, by the centrifugal force, caused to unwind from the body of the stem and slide off the teeth.

In another application for Letters Patent, No. 114,167, filed December 11, 1883, and now pending, I have fully described and shown stems radially (not tangentially) projecting from a vertical rotating support, which stems rotate in one direction while gathering cotton and the opposite direction to release the same, and I have also fully set forth the fact that the cotton on the reversal of the stems is removed therefrom by reason of the inertia of said cotton, or the centrifugal force of rotation of said stem, whereby the cotton is caused to slide outward from and off the picking-teeth. With the construction described in said application the stems are rotated on their axes with the same speed at all times, and they are bodily moved no faster in the cotton-receiving compartment than when out of it, and, as stated in said application, it sometimes happens that when the cotton is unduly moist, or through other accidental conditions, it winds or packs tightly around the stem, so that when the latter is reversed, although the teeth are disengaged, the cotton forms a curved ring around the stem, in which ring the stem rotates.

In my aforesaid application I describe a doffer-blade which, after the stem has been reversed sufficiently under all usual conditions to throw off the cotton by its inertia, touches the periphery of the stem as the latter is carried past it, and in this way I break any possible ring which may have formed, as described, which ring is then thrown off by the subsequent rotation of the stem.

In my present device the speeding of the stems, as described, renders any additional contrivance for this purpose needless, as the extra rapidity of rotation is quite sufficient to insure the throwing off of the cotton from the stems under all conditions.

The preferable arrangement of the stems on the two cylinders D and D' with reference to one another is shown in Figs. 8 and 9, the stems on one cylinder being disposed opposite the intervals between the stems on the other cylinders.

I do not confine myself to any particular construction of cotton-picker stem, other than it should be of substantially the form here shown, and be provided with cotton-picking teeth standing all in the same direction. I preferably employ any one of the several forms of stem already patented to me.

I claim as my invention—

1. In a cotton-harvesting machine, a rotating support, a cotton-picking stem projecting horizontally therefrom, means for rotating said stem on its own axis in alternately-opposite directions, and means for causing said stem to assume a position tangential to the circumferential path of rotation of said support during a certain period of the revolution of said support, substantially as described.

2. In a cotton-harvesting machine, a rotating support, a series of cotton-picking stems projecting horizontally therefrom, means for rotating said stems on their individual axes in alternately-opposite directions, and means for causing said stems to assume a position tangential to the circumferential path of rotation of said support and transversely the line of draft of the machine while entering and leaving the plants, substantially as described.

3. In a cotton-harvesting machine, a cotton-picking stem, in combination with mechanism for effecting three separate and simultaneous movements of said stem—namely, a rotation on its individual axis, a circular movement of translation, and a vibrating or swinging movement through an arc struck from the axis of the immediate support from which said stem projects, substantially as described.

4. In a cotton-harvesting machine, a cotton-picking stem projecting from a support, mechanism for rotating said support, mechanism for simultaneously revolving said stem on its longitudinal axis in alternately-opposite directions, and mechanism for vibrating or swinging said stem through an arc struck from the axis of the immediate support from which said stem projects, substantially as described.

5. In a cotton-harvesting machine, a cotton-picking stem projecting from a support, mechanism for rotating said support, mechanism for simultaneously revolving said stem on its longitudinal axis in alternately-opposite directions, and mechanism for vibrating or swinging said stem in alternately-opposite directions through an arc struck from the axis of the immediate support from which said stem projects, substantially as described.

6. In a cotton-harvesting machine, a support, mechanism for rotating said support on its longitudinal axis, a series of subordinate supports disposed around parallel to the longitudinal axis of and carried by the first-mentioned support, mechanism for rocking said subordinate supports on their longitudinal axes, a series of cotton-picker stems projecting radially from each subordinate support, and mechanism for rotating said stems on their individual axes, substantially as described.

7. In a cotton-harvesting machine, a cotton-receiving compartment and a series of cotton-stems projecting from a vertical support, mechanism for continuously revolving said support, whereby said stems are carried in a circular path alternately into and out of said compartment and into and out of the plants when the machine is moved in proximity to the latter, mechanism for rotating said stems on their individual axes in one direction while in said compartment and in the opposite direction while out of it, and mechanism for vibrating or swinging said stems through arcs struck from the axes of the immediate supports from which said stems project in one direction while in said compartment and in the opposite direction while out of it, substantially as described.

8. In a cotton-harvesting machine, a cotton-receiving compartment and a series of cotton-picker stems projecting from a vertical support, mechanism for continuously revolving said support, whereby said stems are carried in a circular path alternately into and out of said compartment and into and out of the cotton-plants when the machine is moved in proximity thereto and in a direction opposite to that of the forward motion of the machine, mechanism for rotating said stems on their individual axes in one direction while in said compartment and in the opposite direction while out of it, and mechanism for vibrating or swinging said stems through arcs struck from the axes of the immediate supports from which said stems project in the same direction as that of the forward motion of the machine while in said plants and out of said compartment and in the opposite direction while in said compartment, substantially as described.

9. In a cotton-harvesting machine, a cotton-receiving compartment and a series of cotton-picker stems projecting from a vertical rotary support and entering said compartment, mechanism for rotating said stems on their individual axes, and mechanism for vibrating or swinging said stems through arcs struck from the axes of the immediate supports from which said stems project, the said mechanism being constructed and relatively proportioned substantially as set forth, whereby a more rapid movement of vibration is imparted to said stems while in said compartment than while out of it, substantially as described.

10. In a cotton-harvesting machine, a cotton-receiving compartment and a series of cotton-picker stems projecting from a vertical rotary support and entering said compartment, mechanism for rotating said stems on their individual axes, and mechanism for vibrating or swinging said stems through arcs struck from the axes of the immediate supports from which said stems project, the said mechanism being constructed and relatively proportioned substantially as set forth, whereby a more rapid movement of rotation on their individual axes is imparted to said stems while in said compartment than while out of it, substantially as described.

11. In a cotton-harvesting machine, a central shaft, mechanism for rotating the same, a sleeve or cylinder inclosing said shaft and containing a series of chambers having openings in their sides, a series of picker-stems, a stem being journaled at one end in each of said openings, and gearing inclosed in each of said chambers and communicating the rotary motion of the central shaft to each of said picker-stems, substantially as described.

12. In a cotton-harvesting machine, the combination of the shaft E, a means of rotating said shaft, cylinder B, containing chambers F, having openings I, the bevel-gears M N, and the cotton-picker stem A, having an elongated journal-bearing adapted to enter said openings I, and provided with groove or channel K, and a pin or cotter, L, entering said groove and detachably securing said stem in said cylinder, substantially as described.

13. In a cotton-harvesting machine, the stem-supporting cylinder B, formed of the sections C, connected together, substantially as described.

14. In a cotton-harvesting machine, the combination of a central shaft, a means of rotating the same, a sleeve or cylinder inclosing said shaft, a series of picker-stems journaled in said cylinder, mechanism communicating motion from said central shaft to each of said picker-stems to cause them to rotate on their individual axes, and a means for partially rotating said cylinder in alternately-opposite directions, substantially as described.

15. The combination of the shaft $d$, mechanism for rotating said shaft, plates O and P, cylinder B, journaled between said plates, picker-stems A, journaled in said cylinder, shaft E, bevel-gears M N, fixed segmental rack S, and gear-wheels V, W, Y, and Z, substantially as described.

16. The combination of the shaft $d$, mechanism for rotating said shaft, plates O and P, cylinder B, journaled between said plates, shaft E, bevel-gears M N, fixed segmental rack T, and gear-wheels X X', V W, and Y Z, substantially as described.

17. The combination of the shaft $d$, mechanism for rotating said shaft, plates O and P, cylinder B, journaled between said plates, shaft E, bevel-gears M N, fixed segmental rack S, fixed segmental rack T, and gear-wheels X X', V W, and Y Z, substantially as described.

CHARLES T. MASON, Jr.

Witnesses:
R. S. BRADWELL, Jr.,
R. S. BRADWELL.